No. 773,743. PATENTED NOV. 1, 1904.
A. VON HOFFMANN.
IMPLEMENT FOR APPLYING HERBICIDE.
APPLICATION FILED AUG. 1, 1904.
NO MODEL. 2 SHEETS—SHEET 1.

Witnesses.
J. B. Weir.
Robert H. Weir.

Inventor:
Albert von Hoffmann,
by Geo. W. Waldo,
Atty.

No. 773,743. PATENTED NOV. 1, 1904.
A. VON HOFFMANN.
IMPLEMENT FOR APPLYING HERBICIDE.
APPLICATION FILED AUG. 1, 1904.
NO MODEL. 2 SHEETS—SHEET 2.

Witnesses:
J B Weir
Robert H Weir

Inventor:
Albert von Hoffmann
by Inv. E. Waldo,
Atty.

No. 773,743.

Patented November 1, 1904.

UNITED STATES PATENT OFFICE.

ALBERT VON HOFFMANN, OF MILWAUKEE, WISCONSIN, ASSIGNOR OF ONE-HALF TO EDWARD A. CONWAY, OF MILWAUKEE, WISCONSIN.

IMPLEMENT FOR APPLYING HERBICIDE.

SPECIFICATION forming part of Letters Patent No. 773,743, dated November 1, 1904.

Application filed August 1, 1904. Serial No. 213,976. (No model.)

*To all whom it may concern:*

Be it known that I, ALBERT VON HOFFMANN, a citizen of the United States, and a resident of Milwaukee, in the county of Milwaukee and State of Wisconsin, have invented certain new and useful Improvements in Implements for Applying Herbicide, of which the following is a complete specification.

This invention relates to implements for applying poison or herbicide to plants or vegetables for the purpose of destroying the same.

A primary object of the invention is to provide an implement designed and adapted for effectively applying an herbicide to any form of vegetable growth, particularly dandelions, plantains, and other weeds growing in lawns, for the purpose of destroying the same.

A further object of the invention is to provide an implement for this purpose comprising means for protecting surrounding vegetation, as the grass adjacent to weeds growing in a lawn, from receiving an application of the herbicide.

To effect the foregoing objects, an implement of my invention consists of the various features, combinations of features, and details of construction hereinafter described and claimed.

Figure 1:
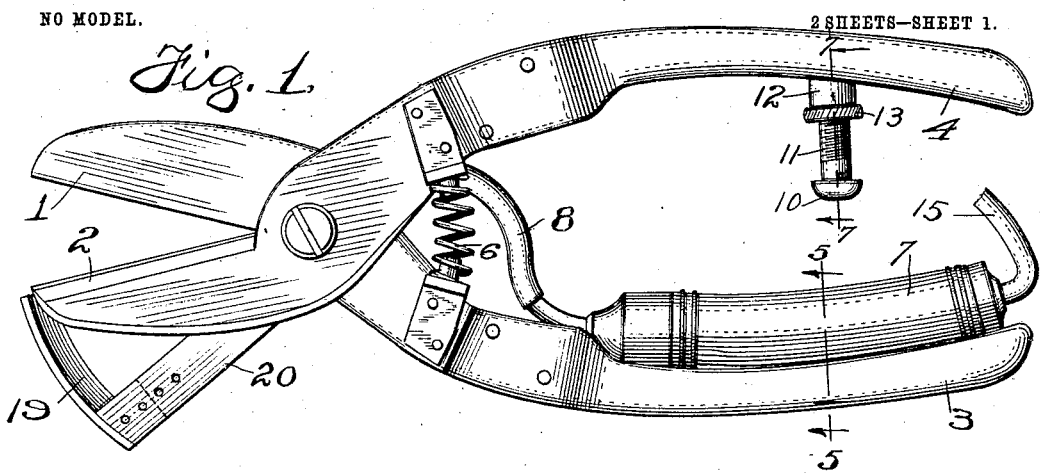
Figure 2:
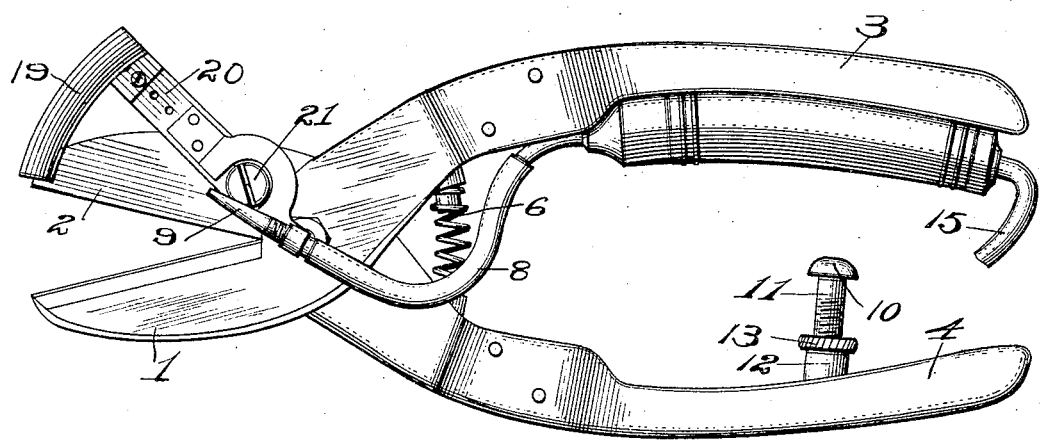
Figure 3:
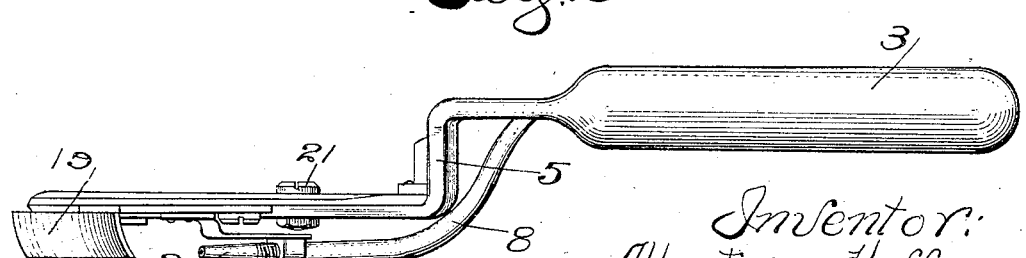
Figure 4:
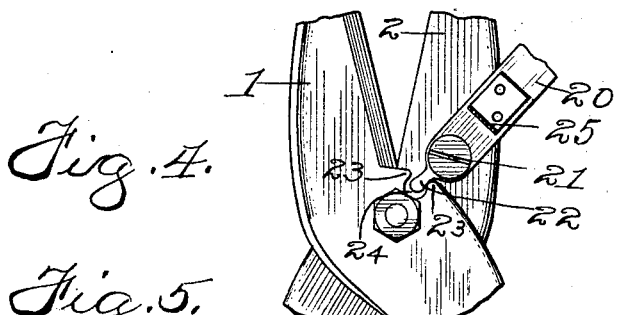
Figure 5:
Figure 6:
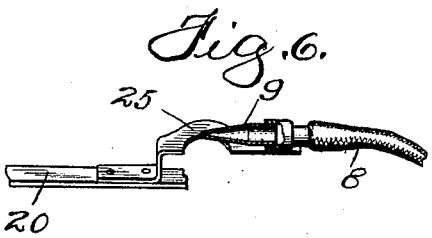
Figure 7:
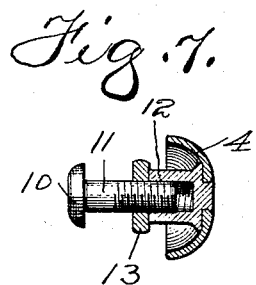
Figure 9:
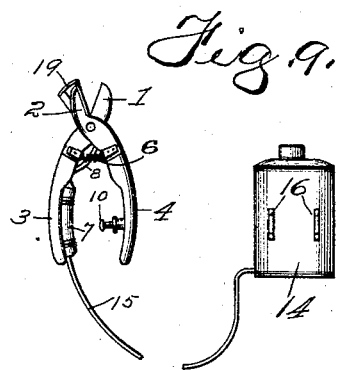
Figure 8:
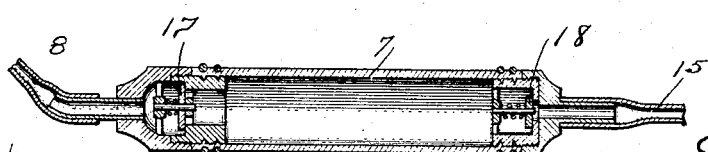

In the accompanying drawings, in which an implement of my invention is fully illustrated, Figure 1 is top plan view of an implement of my invention. Fig. 2 is a bottom plan view thereof. Fig. 3 is a side view thereof. Figs. 4 to 8, inclusive, are detail views; and Fig. 9 is a view, on a relatively small scale, showing an implement of my invention, together with a supply-can therefor.

To provide for effectively applying the herbicide, the root or trunk of the plant is first severed and the herbicide applied to the severed end of the part thereof remaining in the ground, whereby it will pass directly into the circulation of the plant, so as to act in the most effective manner. As shown, the means for severing the root or trunk of the plant consist of shears, which as regards their general features may be of any usual or approved construction, consisting of pivotally-connected members comprising blades 1 and 2 and handles 3 and 4. The blades 1 and 2 are preferably short and thick, and the handles 3 and 4 are preferably bent upwardly, as shown at 5, to provide for conveniently operating said shears when the blades thereof are held close to the ground. The shears are maintained normally open by means of a spring 6 inserted between rigid portions of the handles 3 and 4 thereof.

The means for applying the herbicide are as follows: Secured to the inside of one of the handles of the shears, as shown the handle 3, is a collapsible reservoir 7, as shown a rubber tube, the ends of which are closed by suitable metal caps or plugs, which is provided with a discharge-tube 8, terminating in a nozzle 9, directed to discharge along the under side of the shears in line with the cutting edges of the blades 1 and 2 thereof when in closed position. The tube or reservoir 7 is collapsed or compressed each time the shears are closed by means of a projection 10 on the handle opposite to that to which said reservoir is secured, as shown the handle 4. As shown, said projection 10 consists of a plug or pin 11, threaded to a socket 12 on said handle 4 and adapted to be secured in any desired adjustment by means of a lock-nut 13, thereby providing means for adjusting the length of the projection 10, and thus regulating the compression of the tube or reservoir 7 when the shears are closed.

The herbicide in the form of a liquid may be supplied to the tube or reservoir 7 in any desired manner. As shown, the herbicide is supplied to said tube or reservoir from a can or tank 14, which communicates therewith by means of a tube 15. As shown, the can or tank 14 is supported by means of a belt or the like adapted to be inserted through loops 16 on said can or tank and secured about the waist of the person operating said implement.

The discharge-tube 8 from the tube or reservoir 7 is controlled by means of a valve 17, adapted to prevent the passage of air through said tube into said reservoir, and the tube 15 is controlled by a valve 18, adapted to prevent the passage of liquid from said reservoir backward into the can or tank 14. With this construction it is obvious that when said tube or reservoir 7 is full of liquid compression thereof will operate to discharge a quantity of liquid therefrom through the discharge-tube 8 and nozzle 9 and also that the expansion of said tube or reservoir when released will create a suction which will operate to draw liquid from the tank or can 14 into said tube or reservoir 7, and thus keep the same filled. Also by adjusting the length of the projection 10 to secure a desired compression of said tube or reservoir 7 a desired quantity of liquid will be discharged from said tube or reservoir each time the shears are closed.

To effect the object of the invention as it relates to confining the application of the herbicide to the plant desired, a shield or guard 19 is provided, which is adapted to intercept the discharge from the nozzle 9 at a short distance beyond the desired point of application. In order that the guard or shield 19 may not obstruct the opening between the shear-blades, it is preferably supported upon and is operatively connected with the shear members, the relation being such that opening said shears will operate to move said shield or guard laterally, so that it will be outside of the opening between the points of the shear-blades, and such also that closing said shears will operate to move said shield or guard inwardly across and in front of the points of the shear-blades and in line with the nozzle 9. As shown, the shield or guard 19 is secured to a lever 20, pivoted at 21 to the shear-blade 2, a tongue or projection 22, on which engage projections 23, formed on the shear-blade 1, as shown at the sides of a recess 24 formed therein, said recess being enlarged inside of said projections to afford necessary clearance to provide for desired pivotal movement of said lever 20. As shown, the tongue or projection 22 is of such width relative to the opening between the projections 23 that when the shear-blades have opened a desired distance said projection will contact with both of said projections, which will operate to prevent further movement thereof in this direction. Said tongue or projection 22 will thus form a stop which will operate to limit the opening of the shears under the influence of the spring 6.

To provide for adjusting the guard or shield 19 toward and from the nozzle 9, the lever-arm 20, which carries said guard or shield, is made in sections connected in such manner that said lever-arm may be made longer or shorter to bring said guard or shield nearer to or farther from said nozzle, as may be desired.

In the preferable construction shown the nozzle 9 is supported upon a plate 25, forming an extension of the lever 20, which extends rearwardly to a point substantially in line with the pivotal point of the shear members, the relation being such that when the shears are closed said nozzle 9 will be directed substantially in line with the cutting edges of the shear-blades.

The relation and adjustment of the tube or reservoir 7 and of the projection 10 are such that said projection will come into contact with said tube or reservoir just before the shear-blades are fully closed. With this construction it is obvious that the root or trunk of the plant will be first severed and that a limited quantity of the herbicide, controlled by the length of the projection 10, will be applied to the severed end of the part thereof remaining in the ground and also that the guard or shield 19 will operate to confine the application of the herbicide to the point desired, all in the manner described.

I claim as my invention—

1. An implement consisting of shears, a reservoir, a discharge-tube from said reservoir, and means operated by opening and closing said shears for creating a pressure within said reservoir, substantially as described.

2. An implement consisting of shears, a reservoir, a discharge-tube from said reservoir, means operated by opening and closing said shears for creating a pressure within said reservoir and means to confine the discharge from said discharge-tube, substantially as described.

3. An implement consisting of shears, a reservoir, a discharge-tube from said reservoir, means operated by opening and closing said shears for creating a desired pressure within said reservoir and a guard or shield supported in front of said discharge-tube to confine the discharge therefrom, substantially as described.

4. An implement consisting of shears, a reservoir, a discharge-tube from said reservoir provided with a nozzle supported at the under side of said shears and directed in line with the cutting edges thereof when the shears are closed, means operated by opening and closing said shears for creating a desired pressure within said reservoir, a lever pivoted to one member of the shears, a guard or shield thereon and connection between said lever and the shear member other than that to which said lever is pivoted, whereby closing said shears will move said lever pivotally to bring the guard or shield carried thereon into operative position, and opening said shears will impart pivotal movement to said lever whereby said guard or shield will be moved outwardly beyond the opening between the points of said shears, substantially as described.

5. An implement consisting of shears, a reservoir, a discharge-tube from said reservoir, means operated by opening and closing said shears for creating a desired pressure within said reservoir and a guard or shield supported in front of and adjustable toward and from said discharge-tube to confine the discharge therefrom, substantially as described.

6. An implement consisting of shears, a reservoir, a discharge-tube from said reservoir provided with a nozzle supported at the under side of said shears and directed in line with the cutting edges thereof when the shears are closed, means operated by opening and closing said shears for creating a desired pressure within said reservoir, a lengthwise-adjustable lever pivoted to one member of the shears, a guard or shield thereon and connection between said lever and shear member other than that to which said lever is pivoted, whereby closing said shears will move said lever pivotally to bring the guard or shield carried thereon into operative position and opening said shears will impart pivotal movement to said lever whereby said guard or shield will be moved outwardly beyond the opening between the points of said shears, substantially as described.

7. An implement consisting of shears, a reservoir, a discharge-tube from said reservoir provided with a nozzle supported at the under side of said shears in line with the cutting edges of said shears when closed, means operated by opening and closing said shears for creating a pressure within said reservoir, a lever pivoted to one of the shear members, a guard or shield carried thereon, a projection on said lever and projections on the shear member other than that to which said lever is pivoted which engage said projection on said lever, whereby closing the shears will move said lever pivotally to bring the guard or shield thereon into operative position and opening said shears will move said lever pivotally to bring said guard or shield outwardly beyond the opening between the points of said shears, substantially as described.

8. An implement consisting of shears, a reservoir, means operated by opening and closing said shears for creating a pressure within said reservoir, a discharge-tube from said reservoir provided with a nozzle, a lever pivoted to one member of the shears on one arm of which the nozzle is supported, a guard or shield supported upon the opposite arm of said lever in line with said discharge-nozzle, and operative connection between said lever and the shear member other than that to which said lever is pivoted whereby closing said shears will operate to move said arm pivotally to bring said guard or shield over the ends of the shear-blades and opening said shears will operate to impart pivotal movement to said lever to bring said guard or shield outwardly beyond the opening between the blades of said shears, substantially as described.

9. An implement consisting of shears, a collapsible reservoir secured to one handle thereof, a projection on the other handle thereof for compressing said reservoir and a discharge-tube from said reservoir, substantially as described.

10. An instrument consisting of shears, a collapsible reservoir secured to one handle thereof, a projection on the other handle thereof for compressing said reservoir, a controlled tube which connects said reservoir with a source of supply and a controlled discharge-tube from said reservoir, substantially as described.

11. An implement consisting of shears, a collapsible reservoir secured to one handle thereof, a projection on the other handle thereof for compressing said reservoir, means for adjusting the length of said projection, and a discharge-tube from said reservoir, substantially as described.

12. An implement consisting of shears, a collapsible reservoir secured to one handle thereof, a projection on the other handle thereof for compressing said reservoir, means for adjusting the length of said projection, a controlled tube which connects said reservoir with a source of supply, and a controlled discharge-tube from said reservoir, substantially as described.

13. An implement consisting of shears, a collapsible reservoir secured to one handle thereof, a projection on the other handle thereof for compressing said reservoir, a discharge-tube from said reservoir and means to confine the discharge from said discharge-tube, substantially as described.

In testimony that I claim the foregoing as my invention I affix my signature, in presence of two subscribing witnesses, this 11th day of July, A. D. 1904.

ALBERT VON HOFFMANN.

Witnesses:
MARJORIE MULLIGAN,
L. J. CONWAY.